(12) United States Patent
Bechtel et al.

(10) Patent No.: US 6,552,503 B2
(45) Date of Patent: Apr. 22, 2003

(54) CATHODE RAY TUBE WITH ARRANGEMENT FOR ELECTRON RAY CONTROL

(75) Inventors: Hans-Helmut Bechtel, Roetgen (DE); Wolfgang Busselt, Roetgen (DE); Harald Glaeser, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 40 days.

(21) Appl. No.: 09/995,438

(22) Filed: Nov. 27, 2001

(65) Prior Publication Data

US 2002/0079821 A1 Jun. 27, 2002

(30) Foreign Application Priority Data

Nov. 30, 2000 (DE) .......................... 100 59 766

(51) Int. Cl.⁷ .............................................. H01J 29/56
(52) U.S. Cl. ...................................... 315/370; 313/461
(58) Field of Search .................. 315/370, 3, 399, 315/408; 313/364, 409, 413, 415, 421, 461, 463, 467, 469

(56) References Cited

U.S. PATENT DOCUMENTS

| | | | | |
|---|---|---|---|---|
| 3,890,507 A | * | 6/1975 | Goodman | 250/483.1 |
| 4,635,107 A | * | 1/1987 | Turner | 348/812 |
| 6,013,975 A | * | 1/2000 | Gijrath | 313/407 |

FOREIGN PATENT DOCUMENTS

| | | | |
|---|---|---|---|
| EP | 0725421 A1 | 8/1996 | H01J/31/20 |
| WO | WO9525338 | 9/1995 | H01J/29/52 |
| WO | WO0038212 | 6/2000 | H01J/31/20 |

* cited by examiner

Primary Examiner—Don Wong
Assistant Examiner—Thuy Vinh Tran

(57) ABSTRACT

The invention describes a cathode ray tube in which the position of the electron beam (7, 8, 9) is determined in that detection strips (12, 13) are arranged between or below the individual phosphor strips of the phosphor layer (11). The detection strips (12, 13) each comprise a semiconductor component which amplifies the measured current signal. This renders the position determination of the electron beam (7, 8, 9) more definite and reproducible.

11 Claims, 2 Drawing Sheets

CATHODE RAY TUBE WITH ARRANGEMENT FOR ELECTRON RAY CONTROL

TECHNICAL FIELD OF THE INVENTION

The invention relates to a cathode ray tube provided with a color picture screen, an electron gun for the emission of at least one electron ray, and a deflection device, which color picture screen comprises a front plate, a first set of detection strips and a second set of detection strips, a phosphor layer, a means for receiving signals generated by the detection strips, and a means for passing on correction signals to the deflection device.

BACKGROUND OF THE INVENTION

A color cathode ray tube comprises a color picture screen, a neck, and a cone connecting the color picture screen to the neck, as well as an electron gun provided inside the neck for the emission of at least one electron ray. Deflection coils are present at the neck, deflecting the electron ray horizontally and vertically such that a raster of lines is created. In most cases, color cathode ray tubes have three electron guns for the three basic colors red, green, and blue, which are deflected as one whole by the deflection coils. The color picture screen has a phosphor layer in which the red-, green-, and blue-emitting phosphors are provided either as perpendicular strip triplets or in a pattern of dot triplets arranged in a triangle. To ensure that each of the three electron rays hits only the phosphors associated with it, a so-called shadow mask is provided immediately in front of the color picture screen. Each phosphor triplet is given exactly one opening in the shadow mask, for example a slot or a hole, through which three electron ray beams are passed at slightly different angles.

It is a disadvantage of such a shadow mask that almost 80% of the electrons do not pass through the shadow mask but hit the shadow mask and are subsequently removed. A further disadvantage of a shadow mask is that microphony effects may occur during operation. In addition, a shadow mask may become warped during operation owing to the heat generated therein, such that the openings of the shadow mask no longer occupy the correct positions.

A cathode ray tube with an arrangement for electron ray control is known from WO 00/38212 in which the position of the electron ray is determined in that conductor tracks are arranged under each phosphor strip. The position of the electron ray can be determined from the measured current difference between two adjoining conductor tracks, and a correction may be made, as necessary. Such cathode ray tubes are also denoted index tubes.

In this arrangement, the conductor tracks are covered wholly or partly by the phosphor layer. The phosphor layer itself is usually covered by a thin aluminum layer which is not in contact with the conductor tracks. The thin aluminum layer on the phosphor layer acts as a mirror and reflects light radiated inwards into the tube back in the direction of the front plate.

It is a disadvantage of this construction that only approximately 40 to 50% of the electrons emitted by the electron gun reach the conductor tracks. If the phosphor layer is not covered with an aluminum layer, approximately 70% of the electrons reach the conductor tracks. Owing to the low percentage of the electrons reaching the conductor tracks through the phosphor layer and generating a current signal there, the measured current signals are partly too small and insufficiently reproducible for enabling an unequivocal recognition and assignment of changes in the measured current difference at all times.

SUMMARY OF THE INVENTION

It is accordingly an object of the present invention to avoid the disadvantages of the prior art and to provide an improved cathode ray tube.

This object is achieved by means of a cathode ray tube provided with a color picture screen, an electron gun for the emission of at least one electron ray, and a deflection device, which color picture screen comprises a front plate, a first set of detection strips and a second set of detection strips, a phosphor layer, a means for receiving signals generated by the detection strips, and a means for passing on correction signals to the deflection device, wherein the detection strips each comprise a semiconductor component.

The use of a semiconductor component in each detection strip renders it possible to increase the current signals generated by the detection strips by several orders of magnitude. The measured current signal thus becomes sufficiently strong, also in the case of small electron currents, for changes in the measured current difference to be unequivocally recognized and for a decision on a position change of the electron ray to be possible. The enlargement of the measured current signal lowers the achievable black luminance and improves the dark contrast.

It is preferred that the semiconductor component is chosen from the group of pn diodes and Schottky diodes.

A pn diode is the simplest form of a semiconductor component and can be manufactured in a simple and inexpensive manner. The high-energy electrons of the electron ray are absorbed in the pn junction of the semiconductor component and produce a large number of charge carriers there. The charge carriers are separated in the field which is being generated and are measured as an amplified electron current.

In a Schottky diode, the high-energy electrons of the electron ray are absorbed in the depletion zone present below the metal in the semiconductor, where they produce a large number of charge carriers. The charge carriers are separated in the field which is being generated and are measured as an amplified electron current.

It is particularly preferred that the pn diode comprises a first electrode, an n-conductivity layer, a p-conductivity layer, and a second electrode.

It is particularly preferred that the p-conductivity region of the pn diode is arranged at the side which faces the electron gun.

It is furthermore preferred that the phosphor layer is covered with an aluminum layer.

The thin aluminum layer on the phosphor layer acts as a mirror and reflects visible light which is radiated inwards into the tube back in the direction of the front plate. The efficiency of the index tube is enhanced thereby.

It may be advantageous that it is true for the height H of a detection strip that H>D, with D being the layer thickness of the phosphor layer.

The arrangement of the detection strips between the individual phosphor strips of the phosphor layer prevents high capacitances from arising between the detection strips and the aluminum layer. These capacitances may adversely affect the time constant in the determination of the position of the electron ray. A further advantage of this arrangement is that no current compensation can take place between two detection strips through electron conduction effects in the phosphor layer.

It may be advantageous in this embodiment that the detection strips have a trapezoidal cross-sectional shape.

It may furthermore be advantageous in this embodiment that that side of a detection strip which adjoins the front plate is narrower than the side of the detection strip which faces the electron gun.

Thanks to this embodiment, the provision of the aluminum layer can take place by known vapor-deposition processes without the detection strips and the aluminum layer becoming electrically interconnected. Furthermore, the provision of the aluminum layer and of the second electrode of the semiconductor component with the pn junction may take place in one and the same step.

It may also be advantageous that the detection strips are covered by the phosphor layer.

It is preferred in this embodiment that the electrode of a pn diode lying at the side of the electron gun comprises a transparent material.

In this embodiment, the current signal is mainly generated by the photoelectric effect, i.e. through absorption of the light emitted by the phosphor in the pn diode. In addition, high-energy electrons penetrating the phosphor layer without appreciable energy losses will contribute to the current signal.

It is also preferred in this embodiment that a dielectric layer is provided between the phosphor layer and the detection strips and between the phosphor layer and the front plate.

If the refractive index of the dielectric layer is lower than the refractive index of the front plate, the quantity of specularly reflected light can be reduced by the application of the dielectric layer on the entire picture screen. This enhances the luminance of the cathode ray tube and/or prevents the occurrence of unpleasant external reflections. The dielectric layer also prevents short-circuits from arising during aluminizing of the color picture screen owing to aluminum penetrating through the phosphor layer to the electrodes of the semiconductor component, which would render the entire color picture screen useless.

BRIEF DESCRIPTIONS OF THE DRAWINGS

The invention will be explained in more detail below with reference to four Figures and seven embodiments. In the drawing.

DETAILED DESCRIPTIONS OF THE INVENTION

Figure 1:
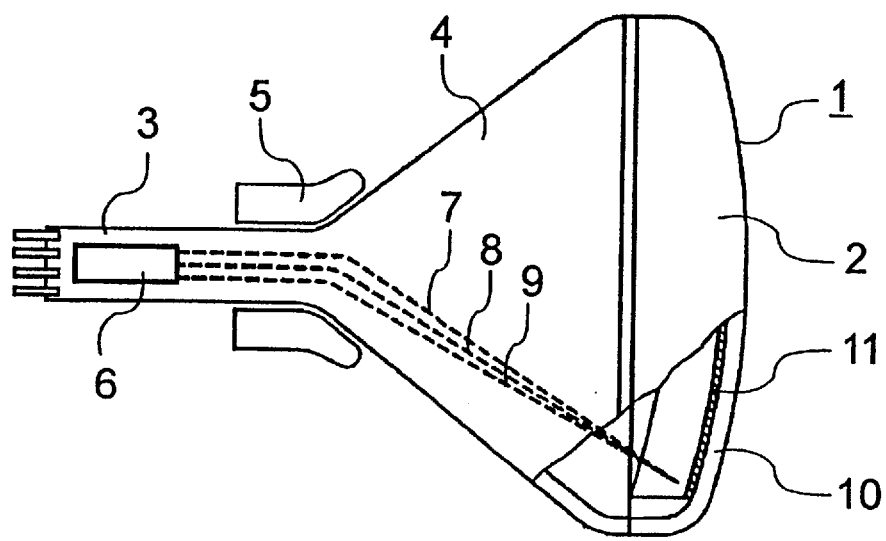
FIG. 1 shows the construction of a cathode ray tube.

FIG. 1 shows a possible embodiment of the invention. The cathode ray tube shown in FIG. 1 is a color cathode ray tube 1 which comprises a color picture screen 2, a neck 3, and a cone 4 which connects the color picture screen 2 and the neck 3 to one another. Inside the neck 3 there is an electron gun 6 which generates three electron rays 7, 8, 9. The latter diverge in a plane, the in-line plane, in this embodiment of a color cathode ray tube 1 and are deflected horizontally and vertically on their way to the color picture screen 2 by a deflection device 5. The color picture screen 2 comprises a front plate 10, and a phosphor layer 11 lies on the front plate 10. The phosphor layer 11 comprises red-, green-, and blue-emitting phosphors which are provided in the form of horizontal strip triplets. Not shown in FIG. 1 is that detection strips, each comprising a semiconductor component, in particular a pn diode or a Schottky diode, are provided between the individual strip triplets of the phosphor layer 11. A means for receiving signals generated by the detection strips 12, 13 and a means for passing on correction signals to the deflection device 5 are also not shown.

Alternatively, the color cathode ray tube 1, in particular the color picture screen 2, may have further features such as an aluminum layer 14 which is provided on the phosphor layer 11. Furthermore, the color picture screen may in addition have a dielectric layer between the phosphor layer 11 and the detection strips 12, 13 as well as between the phosphor layer 11 and the front plate 10.

Figure 2:
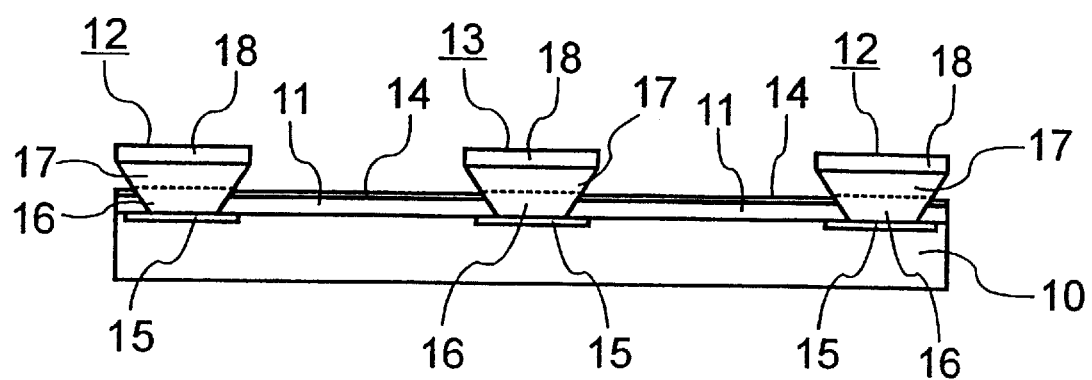
FIGS. 2 and 3 show possible embodiments of a color picture screen in cross-sectional view.

FIG. 2 is a cross-sectional view of an embodiment of a color picture screen 2. Detection strips 12, 13 each comprising a semiconductor component are provided on a front plate 10 of glass. The semiconductor component is preferably a pn diode which is formed by a first electrode 15, an n-conductivity layer 16, a p-conductivity layer 17, and a second electrode 18. The first electrode 15 and the second electrode 18 may comprise a metal, an alloy, a conductive oxide, or combinations of these materials. It may be advantageous that the width of the n-conductivity layer 16 is greater than the width of the first electrode 15. Each detection strip 12, 13 may preferably have a trapezoidal cross-sectional shape, that side of a detection strip 12, 13 which adjoins the front plate 10 being narrower than the side facing the electron gun 6. The phosphor layer 11 is provided between the detection strips 12, 13. The red-emitting phosphor used may be, for example, $Y_2O_2S:Eu$, the blue-emitting phosphor $ZnS:Ag$, and the green-emitting phosphor $ZnS:Cu,Au$. The detection strips 12, which are all electrically interconnected, form a first set of detection strips. The detection strips 13, which are also all electrically interconnected, are the second set of detection strips. The detection strips 12, 13 are provided in alternation. In this arrangement, the high-energy electrons of the electron ray 7, 8, 9 are absorbed in the pn junction of the semiconductor component and generate a large number of charge carriers there. In this embodiment of the color picture screen 2, furthermore, light generated in the phosphor layer 11 is absorbed by the semiconductor component. This results in an additional photocurrent which further strengthens the current signal of the detection strips 12, 13.

A thin aluminum layer 14 may be present on the phosphor layer 11.

Figure 3:
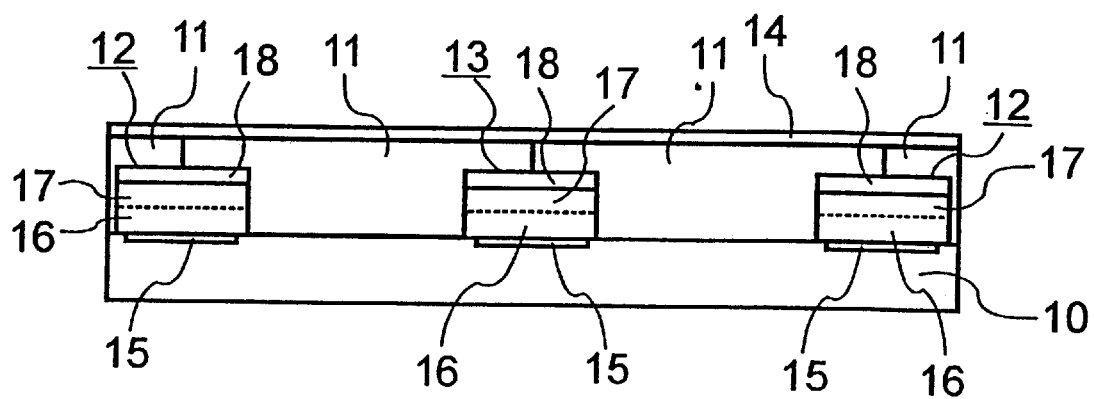

FIG. 3 shows a further possible embodiment of a color picture screen 2. In this case the detection strips 12, 13 are covered by the phosphor layer 11. The second electrodes lying at the side of the electron gun 6 are made of a transparent conductive material such as, for example, ITO in this embodiment. The current signal in this arrangement is mainly generated in the pn junction of the pn diode owing to the absorption of light emitted by the phosphors in the phosphor layer 11. In addition, high-energy electrons penetrating the phosphor layer 11 almost without loss of energy contribute to the current signal.

A detection strip 12, 13 with a semiconductor component with pn junction is preferably arranged such that the p-conductivity layer 17 of the semiconductor component is at the side facing the electron gun 6. The second electrode 18 present on the p-conductivity layer 17 has a layer thickness of between 20 and 1000 nm so as to achieve that the electrons are mainly absorbed in the barrier layer between the p-conductivity layer 17 and the n-conductivity layer 17 of the semiconductor component. The p-conductivity layer 17 of the semiconductor component preferably has a layer thickness of between 100 and 2000 nm. In this embodiment, the total height H of the detection strip 12, 13 is greater than the layer thickness D of the phosphor layer 11, the latter preferably lying between 20 and 50 μm.

Alternatively, the semiconductor component may comprise a Schottky diode in both embodiments. This semiconductor component has a metal-semiconductor junction. In this embodiment, a layer of n-doped or p-doped semiconductor material is present on a first electrode 15. A Schottky metal layer, for example comprising Mo, W, Pt, Ag, Au, Ni, Ti, NiFe, or combinations of these materials, is provided on the semiconductor material. The electrical contacting of the semiconductor component takes place at the Schottky metal layer and the first electrode 15.

A dielectric layer may be provided between the phosphor layer 11 and the detection strips 12, 13 as well as between the phosphor layer 11 and the front plate 10 in this embodiment.

To manufacture a color picture screen 2 with detection strips 12, 13 with a pn diode, first electrodes 15 are first provided in the shape of strips on a front plate 10 of glass by means of vapor deposition or sputtering. A layer of n-doped amorphous silicon or of n-doped III/V compounds is provided on each first electrode 15 by means of CVD (Chemical Vapor Deposition) processes or plasma deposition processes. III compounds which may be used are, for example, Ga, Al, or In, and V compounds may be, for example, P, As, or Sb. Then a p-conductivity layer 17 is provided on each n-conductivity layer 16. The individual layers may be structured by means of known photolithography processes or etching processes. Alternatively, the first electrode 15 and the n-conductivity layer 16 and the p-conductivity layer 17 of the semiconductor component may be manufactured by printing processes. For this purpose, the first electrodes 15 are first printed on the glass of the front plate 10. Then a powder layer of a semiconducting material, for example n-conductivity silicon powder, is provided on each first electrode 15, for example by silk-screen printing, and sintered in an argon atmosphere. If the detection strips 12, 13 are to have a trapezoidal cross-sectional shape, the silk-screen printing of the powder layer of semiconducting material onto the first electrode 15 may take place in several steps, the individual layers becoming wider as they are farther removed from the front plate 10. The p-conductivity layer 17 of the semiconductor component is subsequently manufactured by ion implantation or thermal diffusion of suitable materials, preferably boron.

Alternatively, the detection strips 12, 13 of trapezoidal cross-section may be manufactured by sandblasting. In this method, the first electrodes 15, the n-conductivity layer 16, and the p-conductivity layer 17 are provided by means of one of the processes described above. Then the trapezoidal structure is created by sandblasting of the n-conductivity layer 16 and the p-conductivity layer 17. The sandblasting nozzles are adjusted at an angle of up to 40° to the perpendicular on the surface for this purpose.

Detection strips 12, 13 of trapezoidal cross-sectional shape may alternatively be manufactured by selective etching processes, for example underetching.

The phosphor layer 11 and the second electrodes 18 may be provided at various moments in the manufacturing process, depending on the embodiment of the color picture screen 2.

If the height H of the detection strips 12, 13 is greater than the layer thickness D of the phosphor layer 11, the suspensions of the individual phosphors which emit visible light in the colors red, green, and blue under excitation of electron rays are provided in the spaces between the detection strips 12, 13 in printing processes in the next step. The entire front plate 10 is then given a heat treatment.

If the color picture screen 2 is to have an aluminum layer 14, the phosphor layer 11 is covered with a thin organic film, for example of polyacrylate, and subsequently an aluminum layer 14 is provided, preferably to a layer thickness of between 100 and 300 nm. To obtain a satisfactory adhesion of the aluminum layer 14 to the phosphor layer 11, the organic film may have holes through which the aluminum is directly brought into contact with the phosphor layer 11. The organic layer is removed without residue during the heat treatment of the entire color picture screen 2.

If the detection strips 12, 13 have a trapezoidal cross-section, and the second electrodes 18 of the detection strips 12, 13 are to comprise aluminum, the aluminum layer 14 and the second electrodes 18 of the detection strips 12, 13 may be provided in one process step together with a pn diode. Otherwise, the second electrodes 18 are separately provided by sputtering or vapor deposition.

If, on the other hand, the detection strips 12, 13 are covered by the phosphor layer 11, the second electrode 18 is first provided on each p-conductivity layer 17 of the semiconductor element by means of vapor deposition or sputtering. Then the phosphor layer 11 is provided by silk-screen printing. Subsequently, as described above, an additional aluminum layer 14 may be provided on the phosphor layer 11.

If the color picture screen 2 is to have a dielectric layer in addition, an aqueous suspension of an inorganic colloid such as, for example, $Al_2O_3$, $SiO_2$, $ZnO_2$, or $ZrO_2$ with an average particle diameter of between 20 and 150 nm may be prepared. This suspension is provided on the front plate 10 and the detection strips 12, 13 before deposition of the phosphor layer 11 such that the dielectric layer after drying has a layer thickness of between 100 nm and 1 μm. Alternatively, the dielectric layer may be manufactured through printing with suitable colloidal printing inks or pastes, vapor deposition, or sputtering.

The detection strips 12 are electrically interconnected and the detection strips 13 are electrically interconnected in both embodiments. The two sets of detection strips are connected to detector electronics which comprise a means for receiving signals generated by the detection strips 12, 13 and a means for passing on correction signals to the deflection device 5.

Such a color picture screen 2 may then be used together with a neck 3, a cone connecting the color picture screen 2 to the neck 3, a deflection device 5, and an electron gun 6 provided inside the neck 3 for the emission of three electron rays 7, 8, 9 for the manufacture of a color cathode ray tube 1.

Figure 4:
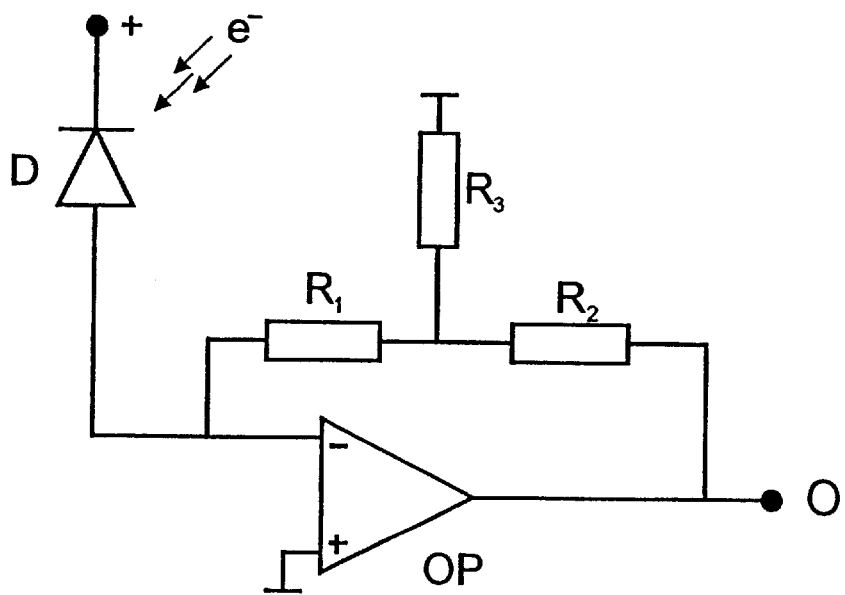
FIG. 4 is a circuit diagram for operating a set of detection strips.

FIG. 4 shows a circuit diagram for the operation of a set of detection strips. The diode D here represents a set of detection strips. The circuit diagram shows a comparison circuit with an operational amplifier OP whose positive input is connected to ground and whose negative input receives a positive voltage via a reverse-biased diode D. A path comprising two resistors $R_1$ and $R_2$ connected in series connects the negative input of the operational amplifier OP to the output of the operational amplifier OP, while a voltage between the two series resistors $R_1$ and $R_2$ is connected to ground via a further resistor $R_3$.

When a reverse bias voltage is applied to the detection strips 12, 13 comprising a semiconductor component, preferably a pn diode or a Schottky diode, the extent of the depletion zone, and thus the capacitance of the semiconductor component can be varied. If silicon is used as the semiconducting material, the capacitance C of a pn diode can vary from 10 $pF/mm^2$ at 0 V bias voltage to 0.05 $pF/mm^2$ at 100 V bias voltage. The level of the bias voltage which can be used is limited exclusively by the structure of the diode D.

A set of detection strips usually has a total surface area of between 1000 and 2000 $mm^2$. This results in RC times in the $\mu s$ to ms range, given a suitable bias voltage.

A color cathode ray tube 1 according to the invention comprises such a circuit for each set of detection strips. A means for receiving signals generated by each circuit, i.e. by each set of detection strips, generates a current difference signal for the measured current signals on the basis of which the position of the electron rays 7, 8, and 9 can be determined. If the current difference signal is equal to zero, the electron rays 7, 8, and 9 are exactly in the center of the corresponding phosphor line in the phosphor layer 11. If the current difference signal has a positive or negative value, the electron rays 7, 8, and 9 have been shifted in upward or downward direction in the phosphor lines. In that case the means for passing on correction signals to the deflection device 5 are capable of correcting the position of the electron rays 7, 8, or 9. To achieve that the electron rays 7, 8, 9 each excite only one phosphor line in a horizontal scan, the electron rays 7, 8, 9 are not arranged directly one below the other, but are staggered by one phosphor line.

The detector electronics can be kept simple in that the positions of all three electron rays 7, 8, and 9 are determined simultaneously by means of one signal. It is advantageous in this embodiment that the color cathode ray tube 1 comprises a correction system which controls and corrects the positions of the electron rays 7, 8, and 9 with respect to one another. This correction system prevents the situation in which the position of only one electron ray 7, 8, or 9 changes, and a measured current difference signal causes all three electron rays 7, 8, and 9 to be corrected in one go.

Alternatively, the color cathode ray tube may operate with one electron ray or with two or more electron rays.

Embodiments of the invention will be explained in more detail below, representing examples of how the invention may be carried into practice.

Embodiment 1

For manufacturing a color picture screen 2, first electrodes 15 of Al were first provided in the form of strips on a glass front plate 10. An n-conductivity layer 16 of phosphorus-doped amorphous silicon was provided on each first electrode 15 in a CVD process. Then a p-conductivity layer 17 of boron-doped amorphous silicon was provided on each n-conductivity layer 16. Suspensions of the individual phosphors were provided in the spaces between the detection strips 12, 13 in a printing process for manufacturing the phosphor layer 11 in the next step. The red-emitting phosphor used was $Y_2O_2S:Eu$, the blue-emitting phosphor ZnS:Ag, and the green-emitting phosphor ZnS:Cu,Au. The entire front plate 10 was subsequently given a heat treatment. In the next step, the second electrodes 18 of Al were sputtered onto each of the p-conductivity layers 17.

The detection strips 12 were electrically interconnected and the detection strips 13 were electrically interconnected. The two resulting sets of detection strips were connected to detector electronics which comprised a means for receiving signals generated by the detection strips 12, 13 and a means for passing on correction signals to the deflection device 5.

Such a color picture screen 2 was used together with a neck 3, a cone 4 connecting the color picture screen 2 to the neck 3, a deflection device 5, and an electron gun 6 provided inside the neck 3 for the emission of three electron rays 7, 8, 9, in the assembly of an improved color cathode ray tube 1.

Embodiment 2

A color picture screen 2 was manufactured as described with reference to embodiment 1 and used for assembling a color cathode ray tube 1, but in this case the second electrode 18 was provided by sputtering first after the deposition of the p-conductivity layer 17, and after that the phosphor layer 11 was provided. The phosphor layer 11 covered the detection strips 12, 13 fully.

Embodiment 3

A color picture screen 2 was manufactured as described with reference to embodiment 1 and used for assembling a color cathode ray tube 1, but in this case a trapezoidal structure was given to the detection strips 12, 13 by means of sandblasting of the n-conductivity layer 16 and the p-conductivity layer 17 after the p-conductivity layer 17 had been provided. For this purpose, the sandblasting nozzles were aimed at an angle of 35° to the perpendicular on the surface.

Embodiment 4

A color picture screen 2 was manufactured as described with reference to embodiment 1 and used for assembling a color cathode ray tube 1, but in this case a thin organic film of poly(iso-butylmethacrylate) was provided on the phosphor layer 11 before the deposition of the second electrodes 18, such that individual phosphor particles were not covered by the polyacrylate film. Then the aluminum layer 14 with a layer thickness of 200 nm was deposited with the use of a mask. The organic layer was subsequently removed without residue during the heat treatment of the complete color picture screen 2.

Embodiment 5

A color picture screen 2 was manufactured as described with reference to embodiment 2 and used for assembling a color cathode ray tube 1, but in this case a thin organic film of poly(iso-butylmethacrylate) was provided on the phosphor layer such that individual phosphor particles were not covered with the polyacrylate film. Then the aluminum layer 14 was deposited with a layer thickness of 100 nm. The organic layer was later removed without residue during the heat treatment of the complete color picture screen 2.

Embodiment 6

A color picture screen 2 was manufactured as described with reference to embodiment 5 and used for assembling a color cathode ray tube 1, but in this case an aqueous suspension of colloidal $SiO_2$ with an average particle diameter of 80 nm and a non-ionic surfactant was provided on the entire front plate 10 before the deposition of the phosphor layer 11. The suspension was evenly distributed over the front plate 10 and the detection strips 12, 13 through rotation of the front plate 10. After drying of the entire front plate 10 at 200° C., a dielectric layer of 300 nm layer thickness was obtained.

Embodiment 7

A color picture screen 2 was manufactured as described with reference to embodiment 3 and used for assembling a color cathode ray tube 1, but in this case a thin organic film of poly(iso-butylmethacrylate) was provided on the phosphor layer 11 such that individual phosphor particles were not covered with the polyacrylate film. Then the second electrodes 18 and the aluminum layer 14, each with a layer thickness of 100 nm, were deposited in one step. The organic layer was later removed without residue during the heat treatment of the entire color picture screen 2.

What is claimed is:

1. A cathode ray tube provided with a color picture screen (2), an electron gun (6) for the emission of at least one electron ray (7, 8, 9), and a deflection device (5), which color picture screen (2) comprises a front plate (10), a first set of detection strips and a second set of detection strips, a phosphor layer (11), a means for receiving signals generated by the detection strips, and a means for passing on correction signals to the deflection device (5), wherein the detection strips (12, 13) each comprise a semiconductor component.

2. A cathode ray tube as claimed in claim 1, characterized in that the semiconductor component is chosen from a group of pn diodes and Schottky diodes.

3. A cathode ray tube as claimed in claim 2, characterized in that the pn diode comprises a first electrode (15), an n-conductivity layer (16), a p-conductivity layer (17), and a second electrode (18).

4. A cathode ray tube as claimed in claim 3, characterized in that the p-conductivity layer (17) of the pn diode is arranged at a side which faces the electron gun (6).

5. A cathode ray tube as claimed in claim 1, characterized in that the phosphor layer (11) is covered with an aluminum layer (14).

6. A cathode ray tube as claimed in claim 1, characterized in that it is true for the height H of a detection strip (12, 13) that H>D, with D being the layer thickness of the phosphor layer (11).

7. A cathode ray tube as claimed in claim 1, characterized in that the detection strips (12, 13) have a trapezoidal cross-sectional shape.

8. A cathode ray tube as claimed in claim 7, characterized in that a side of a detection strip (12, 13) which adjoins the front plate (10) is narrower than a side which faces the electron gun (6).

9. A cathode ray tube as claimed in claim 1, characterized in that the detection strips (12, 13) are covered by the phosphor layer (11).

10. A cathode ray tube as claimed in claim 9, characterized in that an electrode of a pn diode lying at the side of the electron gun (6) comprises a transparent material.

11. A cathode ray tube as claimed in claim 9, characterized in that a dielectric layer is provided between the phosphor layer (11) and the detection strips (12, 13) as well as between the phosphor layer (11) and the front plate (10).

* * * * *